United States Patent [19]

Kitamura

[11] 4,379,631
[45] Apr. 12, 1983

[54] APPARATUS HAVING A COPIER FUNCTION AND A PRINTER FUNCTION

[75] Inventor: Takashi Kitamura, Yokohama, Japan

[73] Assignee: Canon Kabushiki Kaisha, Tokyo, Japan

[21] Appl. No.: 156,218

[22] Filed: Jun. 3, 1980

[30] Foreign Application Priority Data

Jun. 8, 1979 [JP] Japan .................................. 54-72611
Jun. 11, 1979 [JP] Japan .................................. 54-73635
Jul. 13, 1979 [JP] Japan .................................. 54-89112
Dec. 26, 1979 [JP] Japan ................................. 54-169565
Dec. 28, 1979 [JP] Japan ................................. 54-171332

[51] Int. Cl.³ ........................ G03G 15/00; G03B 19/00
[52] U.S. Cl. .................................. 355/14 R; 355/3 R; 355/8
[58] Field of Search ............... 355/14 R, 3 R, 8, 6, 355/7, 46, 17, 69, 70, 14 E; 354/3, 5; 346/76 L

[56] References Cited

U.S. PATENT DOCUMENTS 4,046,471  9/1977  Branham et al. ............... 355/3 R X
4,124,286 11/1978  Barasch ............................. 355/3 R
4,167,324  9/1979  Wu ..................................... 355/7 X
4,296,423 10/1981  Nakamura ..................... 355/14 E X
4,303,332 12/1981  Sakai ............................... 355/14 R Primary Examiner—A. C. Prescott
Attorney, Agent, or Firm—Fitzpatrick, Cella, Harper & Scinto

[57] ABSTRACT

This specification discloses an apparatus having both the copier function of optically exposing the surface of a photosensitive member to an original image and the printer function of converting an electrical information signal into light and exposing the surface of the photosensitive member to such light. The apparatus has a switching device for switching on and off the exposure of the surface of the photosensitive member by the copier function and the printer function, and a timing device governing the ON-OFF switching by the switching device. Thereby, the exposure of the surface of the photosensitive member by the copier function and the printer function can be switched on and off at necessary timed intervals to form an image.

5 Claims, 51 Drawing Figures

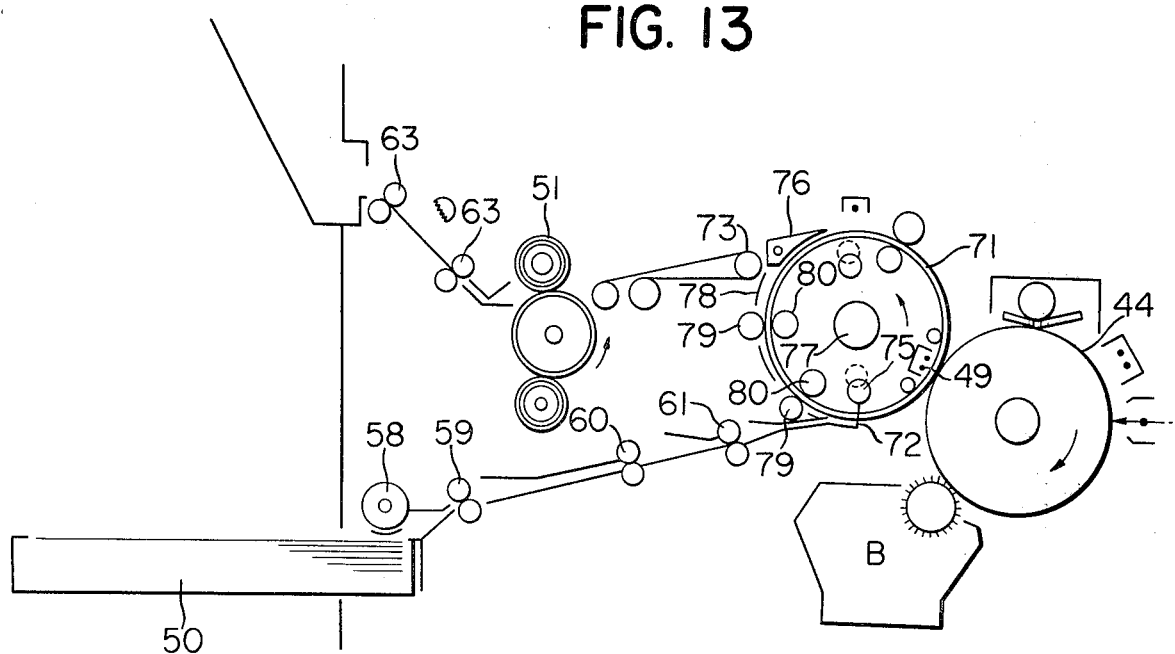
FIG. 13
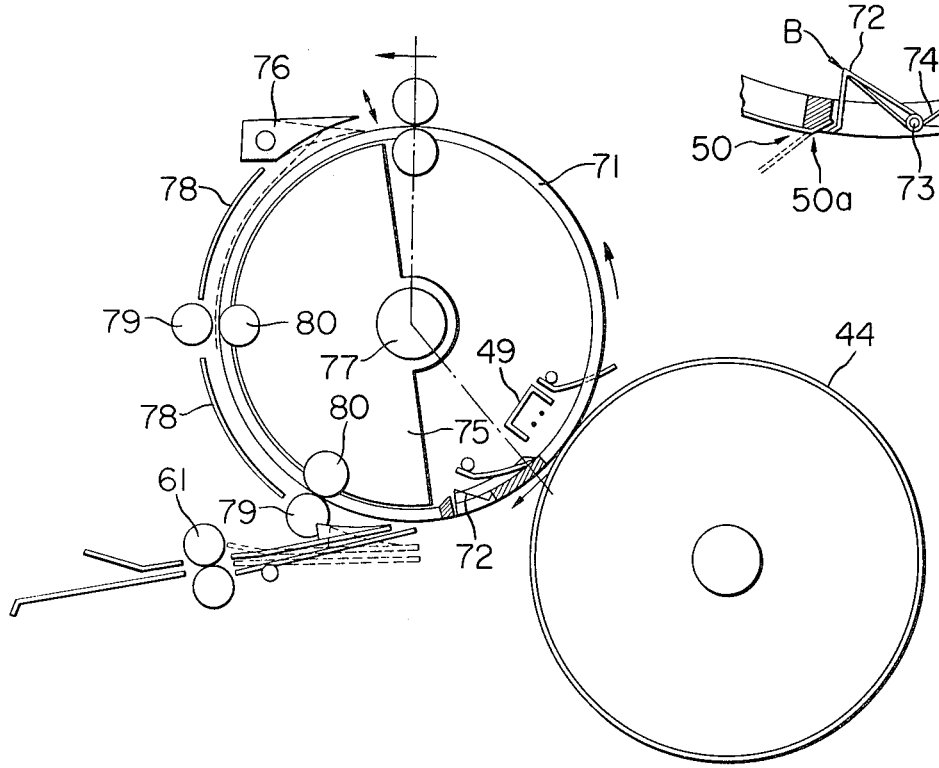
FIG. 14B
FIG. 14A

SCANNING DIRECTION

SCANNING DIRECTION

ILLUMINATION LAMP ON

ILLUMINATION LAMP ON

APPARATUS HAVING A COPIER FUNCTION AND A PRINTER FUNCTION

BACKGROUND OF THE INVENTION

1. Field of the Invention

This invention relates to a multifunction apparatus having a copier function and a printer function, and more particularly to an image formation apparatus in which said two functions are performed at a time to synthesize an original image and an electrical signal image.

2. Description of the Prior Art

At present, multifunction apparatus having both the function of a copier producing copies from originals and the function of a printer utilizing such copier function to produce copies from an input (electricity, magnetism or the like) other than originals are about to be put into practical use.

As a system in which such copier function and other image recording function are combined together to obtain a combined image consisting of the exposure images by the respective functions, there has been known and proposed an overlay system utilizing the electrophotographic system. For example, systems in which the conventional xerography system is utilized to expose a photosensitive plate to an original of a form to be overlaid in the xerographic process and then data written into this form is imparted to the photosensitive member are disclosed in U.S. Pat. Nos. 3,045,587 and 3,523,725.

Also, systems which, unlike the above-mentioned systems, utilize the NP electrographic process as disclosed in U.S. Pat. Nos. 3,666,363 and 4,071,361 to obtain an overlay image are described in U.S. Pat. No. 4,122,462 and U.S. applications Ser. Nos. 935,987 now U.S. Pat. No. 4,257,701; 104,704 now abandoned and 121,657 now U.S. Pat. No. 4,329,413 of the assignee of the present invention.

In these overlay systems, a moving photosensitive member is sequentially exposed to a first image and a second image or optical image to be overlaid and therefore, the positioning for overlaying the two images on the photosensitive member is desired during the respective times of exposure or recording.

The above-described overlay technique is a method of complex utilization of the copier function and another image information recording function. There have heretofore been needs for a system having such multiple functions, but concrete proposals for realizing one have been limited.

As regards the needs, a multifunction apparatus having both the copier function and the printer function has merit in that the apparatus itself can be made compact and low in cost because some of the components of a single function copier and printer can be made common to one another. Further, in such an apparatus, not only the working ratio of the apparatus can be increased by selectively using the copier function and the printer function, but also the respective functions can be performed at a time to obtain a hard copy in which an original image and an electrical signal image are combined together. According to this, photographs requiring half tone or pictures, graphs, forms or the like which are difficult to encode can be copied with the copier function while, at the same time, writings edited by a word processor can be copied with the printer function.

Generally, in the conventional image recording apparatus such as electrophotographic copying machines, the photosensitive member used is of a larger size than the size of the originals to be copied. This is to enable the apparatus as an office copier to select a plurality of original sizes (for examples, JIS A3, A4, B4, B5 formats). Also, even in apparatus wherein the size changeover is not effected, the charging width for the photosensitive member is usually greater than the image exposure width in order to eliminate an unsatisfactory charging effect, and with the transfer type apparatus, it is usually the case that for convenience of a device for separating transfer paper from the photosensitive member, the end area of the photosensitive member in opposed relationship to which such separating member is disposed is left as the non-imaged area. For these reasons, it is unavoidable that the non-imaged area is formed on the photosensitive member. If the step shifts to the visualizing process when charge or potential remains in this non-imaged area, developer such as toner would adhere to the non-imaged area, which means wasteful consumption of the developer, and moreover, the developer adhering to such non-imaged area would not be transferred to transfer paper but would remain on the photosensitive member, so that with rotation of the photosensitive member, such developer would adhere or scatter to the developing station, the cleaning station and other process stations to contaminate these stations excessively.

To solve such problem, there is a method of stopping the rotation of the developing device in the non-imaged area of the photosensitive member to thereby suppress the developing effect, or in cases where a rotatable magnet brush is used in the developing device, a method of using a plate member in the non-imaged area of the photosensitive member to reduce the brush height of the magnet brush and thereby suppress the developing effect.

However, the above-described mechanical means for solution repetitively requires the rotating apparatus to be suddenly stopped, started and moved and this prevents higher speed of the image recording apparatus.

As a solution to this problem, a method of irradiating the non-imaged area of the photosensitive member by an auxiliary exposure device (hereinafter referred to as the blank exposure) to thereby cause the surface potential of the non-imaged area to disappear is effective. From the convenience with which such blank exposure can be freely imparted, a copier-printer apparatus having the previously described printer function is the more effective as well.

SUMMARY OF THE INVENTION

It is therefore an object of the present invention to provide a copying apparatus in which the copier function and the printer function may be performed at a single time to thereby enable a copy in which an original image and an electrical signal image have been combined together to be simply obtained.

It is another object of the present invention to provide an image formation apparatus having both the copier function of optically exposing the surface of a photosensitive member to an original image and the printer function of converting an electrical image signal into light and exposing the surface of the photosensitive member to such light, said apparatus having means for switching on and off the exposure of the surface of said photosensitive member by the copier function and the printer function, and means for obtaining the timing for switching on and off said means, whereby the exposure of the surface of said photosensitive member by the copier function and the printer function is switched on and off at necessary timing intervals.

It is still another object of the present invention to provide a method and apparatus having the copier function and the printer function and wherein the whole or part of a non-imaged area other than the imaged area formed on the photosensitive member is exposed to a laser beam and the exposed area is processed substantially unvisualizably.

It is yet still another object of the present invention to provide an apparatus having both the copier function of optically exposing the surface of a photosensitive member to an original image and the printer function of converting an electrical image signal into light and exposing the surface of the photosensitive member to such light and wherein copying may be effected on one side of copy paper a plurality of times.

It is a further object of the present invention to provide an image formation apparatus having both the copier function of optically exposing the surface of a photosensitive member to an original image and the printer function of converting an electrical image signal into light and exposing the surface of the photosensitive member to such light. This apparatus has means for controlling the exposure of the surface of said photosensitive member by the copier and the printer functions, and means for obtaining the timing for controlling these, whereby when a copy in which the original image and the electrical signal image have been combined is to be obtained by suitably selecting the exposure by each function, light is applied by the use of exposure means of the printer function to an area in which the amount of exposure by the copier function is insufficient, in the boundary portion between the exposed areas by said two functions. An unsatisfactory image in the boundary portion on the combined image between the original image and the electrical signal image is thereby eliminated and a good combined copy is provided.

It is a further object of the present invention to provide an information recording apparatus having both the copier function and the printer function, said apparatus having a plurality of information exposure stations provided to form image information on a recording medium. At least one of said information exposure stations has means for projecting a high energy beam, said apparatus being provided with safety means for intercepting said beam from the optical path in a mode wherein said high energy beam is not projected.

It is still a further object of the present invention to provide an information recording apparatus having the copier function and the printer function by a laser beam. The apparatus has an original image exposure station and a laser beam exposure station connected together and a filter member for attenuating only the light corresponding to the wavelength of said laser beam is provided in the optical path of the original image exposure station.

Other objects and features of the present invention will become apparent from the following description of some embodiments of the invention taken in conjunction with the accompanying drawings.

BRIEF DESCRIPTION OF THE DRAWINGS

FIG. 13 is a schematic view showing the construction of a third embodiment of the present invention.

FIGS. 14(A) and (B) are enlarged views of portions of the FIG. 13 embodiment.

DESCRIPTION OF THE PREFERRED EMBODIMENTS

Preferred embodiments of the present invention will hereinafter be described, but of course these are only illustrative and the present invention is not restricted thereto.

EMBODIMENT 1

This embodiment is an image formation system in an apparatus having both the copier function of optically an apparatus having both the copier function of optically exposing the surface of a photosensitive member to an original image and the printer function of converting an electrical image signal into light and exposing the surface of the photosensitive member to such light. This system has means for controlling the exposure of the surface of the photosensitive member by the copier and printer functions and means for obtaining the timing for controlling these and wherein the exposure by each function is suitably selected and effected, whereby when a copy having the original image and the image by the electrical signal combined together is to be obtained, the whole or part of the non-imaged area of the photosensitive medium is exposed to a laser beam and the exposed portion is processed so that it cannot substantially be visualized.

Figure 1:
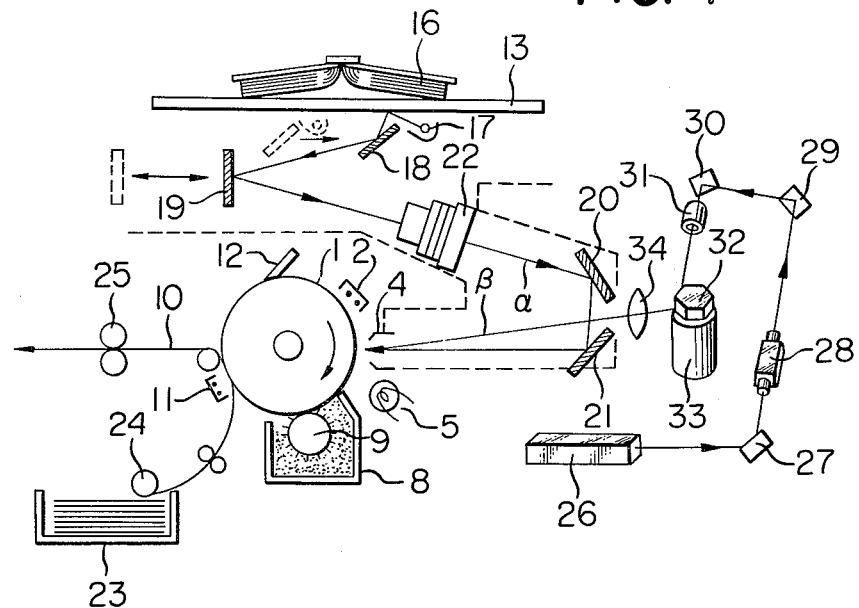
FIG. 1 is a schematic view showing the construction of an embodiment of the present invention.
Figure 2:
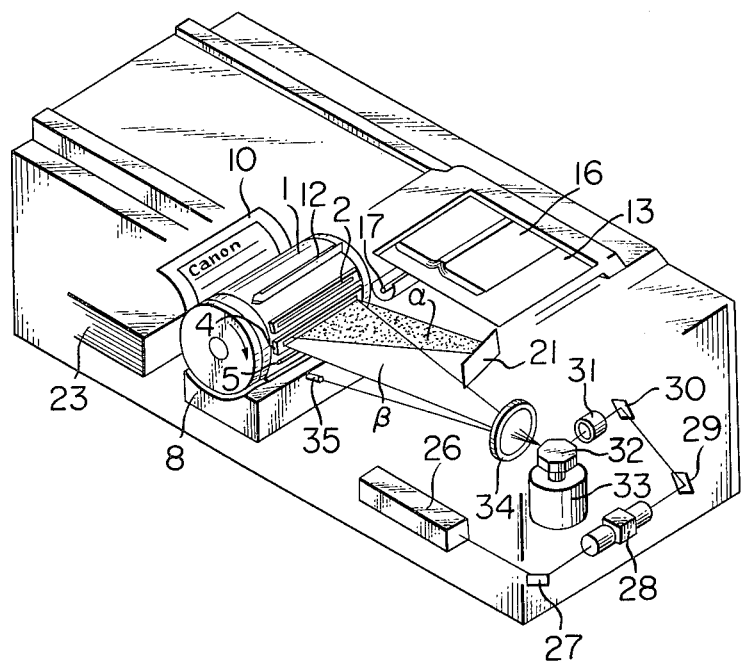
FIG. 2 is a partly broken away perspective view of the apparatus shown in FIG. 1.

FIG. 1 is a schematic illustration of an electrophotographic copying apparatus having a laser image recording unit (laser beam printer) contained therein, and FIG. 2 is a perspective view of such apparatus. This is an apparatus having both the function of an ordinary copying machine and the function of a computer output printer. Designated by 16 is an original such as a book or the like placed on an original carriage 13. Denoted by 17 is a light source for illuminating the original, and designated by 18-21 are mirrors for providing for the path of the original illumination reflected light. Because the original carriage is of the stationary type, the mirrors 18 and 19 are moved as indicated by broken lines in FIG. 1 to scan the surface of the original with the light source 17. Designated by 22 is an image forming lens for forming the optical image of the original on the surface of a photosensitive drum 1 through an optical path α. Denoted by 23 is a paper supply cassette. Transfer paper 10 in the cassette is fed toward the photosensitive drum 1 by a paper feed roller 24 with good timing and is subjected to image transfer under the action of an image transfer corona discharger 11, whereafter the transfer paper is transported to fixing rollers 25.

Further, there is a laser recording unit which comprises a laser oscillator 26, mirrors 27, 29, 30, a beam modulator 28, a beam expander 31, a rotatable polygonal mirror 32, a motor 33 for driving the polygonal mirror, and an f.θ lens 34. The exposure by this laser beam will hereinafter be described. The laser beam oscillated by the laser oscillator 26 is directed via the mirror 27 to the input opening of the deflector-modulator 28. The mirrors are inserted to bend the optical path to reduce the space of the apparatus, and they may be eliminated if not required. The deflector-modulator 28 may be an acoustooptic deflector-modulator element utilizing the conventional acoustic effect or an electrooptic element utilizing the electrooptic effect. In the deflector-modulator 28, the laser beam is subjected to strong or weak modulation in accordance with the image information signal input to the deflector-modulator 28 and is also deflected.

Where the laser oscillator is a semiconductor laser or even a gas laser and if the laser is of the type which permits current modulation or of the internal modulation type which incorporates a modulation element in the oscillation optical path, the modulator 28 would be unnecessary. The light from these light sources passes through a suitable reflecting optical system to the beam expander 31.

The laser beam from the modulator 28 has its beam diameter expanded by the beam expander 31 while remaining a parallel beam. The laser beam having its beam diameter so expanded impinges on the rotatable polygonal mirror 32 having one or more mirror surfaces. The polygonal mirror is mounted on a shaft supported by a high-precision bearing (for example, a pneumatic bearing) and is driven by a constant speed motor 33 (for example, a hysteresis synchronous motor or a DC servomotor). The laser beam is horizontally scanned by the rotatable polygonal mirror 32. Alternatively, this scanning may be effected by the use of a galvano mirror.

The laser beam horizontally scanned by the rotatable polygonal mirror 32 is imaged as a spot on the photosensitive drum 1 by the image forming lens 34 having f.θ characteristic. The f.θ characteristic will hereinafter be described.

In an ordinary image forming lens, when the incidence angle of light ray is $\theta$, the position $\gamma$ whereat the light ray is imaged on the image plane is in the relation that $$\gamma = f \cdot \tan \theta \qquad (1)$$

(f is the focal length of the image forming lens) and the laser beam β reflected by the rotatable polygonal mirror 32 rotated at a constant speed as in the present embodiment has its angle of incidence on the conventional image forming lens varied with time in the fashion of linear function. Accordingly, the speed of movement of the spot imaged on the photosensitive drum 1 which is the image plane varies non-linearly and is not constant. That is, at a point whereat the angle of incidence becomes greater, the speed of movement is increased. Accordingly, if the laser beam is switched on at a predetermined time interval to depict a row of spots on the photosensitive drum 1, the intervals between the spots are wider at the opposite ends of the row than at the central portion thereof. To avoid such phenomenon, the image forming lens 34 is designed to have a characteristic as represented by $$\gamma = f \cdot \theta \quad (2)$$

Such image forming lens 34 is called the $f.\theta$ lens. Further, when a parallel beam is imaged in the form of a spot by an image forming lens, the minimum diameter $d_{min}$ of that spot is given by $$d_{min} = f\lambda/A \quad (3)$$

where
f: the focal length of the image forming lens
λ: the wavelength of the light used
A: the entrance opening of the image forming lens
and if A is made great when f and λ are constant, there may be obtained a smaller spot diameter $d_{min}$. The previously described beam expander 31 is used to provide for such effect. Accordingly, where the necessary $d_{min}$ is provided by the beam diameter of the beam oscillator, the beam expander 31 will be omitted. A beam detector 35 comprises a small entrance slit and a photoelectric conversion element of quick response time (for example, a PIN diode). The beam detector 35 detects the position of the laser beam β swept and this detection signal determines the timing of the start of the horizontal scanning input signal to the modulator 28 for providing desired light information on the photosensitive drum 1. By this, the mis-synchronization between horizontal signals resulting from the error in accuracy of division of the reflecting surfaces of the rotatable polygonal mirror 32 and irregularity of rotation thereof can be greatly reduced to ensure obtainment of images of good quality, and also the tolerance of the accuracy required of the rotatable polygonal mirror 32 and drive motor 33 becomes greater to permit these to be manufactured at lower cost.

The laser beam β modulated by image information signal in the manner described above is deflected axially of the photosensitive drum 1 by the rotatable polygonal mirror 32 and scanned through the $f.\theta$ lens 34, whereby an electrostatic image corresponding to the image signal (a signal which modulates the laser beam so that the actual laser beam does not impinge on the dark area to be visualized but impinges on the light area) can be formed on the surface of the photosensitive drum 1. The latent image formation and subsequent image formation processes are common both in the original copying and the laser recording. However, because the surface potential portion of the dark area of the photosensitive member is developed, the image signals applied to the laser must be designed such that the laser beam is not applied to the portion to be visualized.

Now, as is apparent from FIGS. 1 and 2, in the present embodiment, an optical system is arranged such that the original illuminating light α and the laser beam β can be applied to the photosensitive member at one time. (Change-over of the optical path using mirrors is not carried out).

Figure 3A:
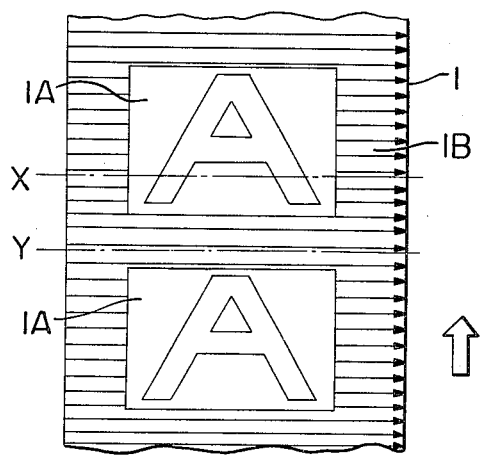
FIG. 3(A) is a developed view of a photosensitive member on which images have been formed by the apparatus shown in FIGS. 1 and 2.
Figure 3B:
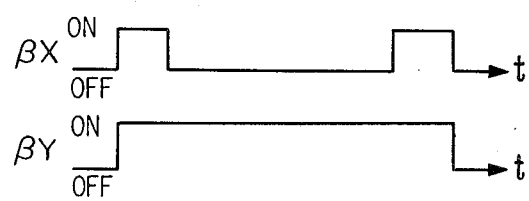
FIG. 3(B) illustrates the application conditions of a laser beam on lines X and Y in FIG. 3(A).

By the optical system being arranged in the above-described manner, the present embodiment eliminates the necessity of providing a special blank exposure device provided with mechanical light-intercepting means. That is, even during the original copying, the non-imaged area of the photosensitive member can always be scanned by and exposed to the laser beam and therefore, the surface potential of the non-imaged area of the photosensitive member can be reduced to prevent adherence of toner to such area. FIG. 3(A) is a developed view of the photosensitive member 1, in which reference character 1A designates the image of the original formed by the original illuminating light α shown in FIGS. 1 and 2 and reference character 1B designates the non-imaged area simultaneously exposed by the scanning of the laser beam β. The application conditions of the laser beam at scanning positions X and Y in FIG. 3(A) are illustrated as βX and βY in FIG. 3(B). Modulating the laser beam as shown by βX and βY can be carried out by knowing the size of the non-imaged area 1A and the speed of movement of the photosensitive member.

As described above, if the blank exposure method of the laser beam according to the present embodiment is adopted, different variations in size of the original, namely, complicated shape of the non-imaged area on the photosensitive member can be easily coped with by controlling the electrical input signal of the laser recording unit. Further, not only the necessity of providing a special blank exposure device will be eliminated, but also it will be possible to sufficiently follow the tendency of the electrophotographic apparatus toward higher speed.

Figure 4A:
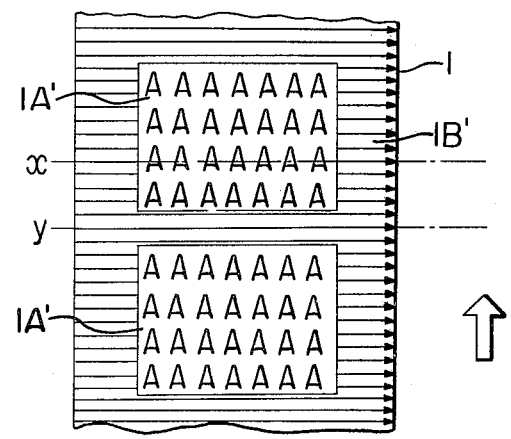
FIG. 4(A) is a developed view of another example of the photosensitive member of FIG. 3(A).
Figure 4B:
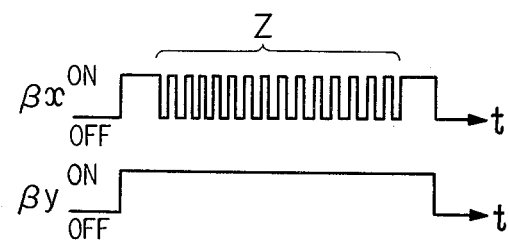
FIG. 4(B) illustrates the application conditions of a laser beam on lines X and Y in FIG. 4(A).

The above embodiment has been described with respect to a case where the image formation apparatus is used as a copying machine, but again in a case where the image formation apparatus is caused to function as a laser beam printer, the blank exposure method in the present invention can of course be utilized intact. The principle thereof will be described by reference to FIGS. 4(A) and (B) which are similar to FIGS. 3(A) and 3(B). In FIG. 4(A), reference character 1A' designates imaged areas formed by the scanning of the laser beam β modulated by input image signals, and reference character 1B' designates a non-imaged area exposed by the scanning of the laser beam β. The application conditions of the laser beam at scanning positions x and y in FIG. 4(A) are illustrated as βx and βy in FIG. 4(B). The portion of βx indicated by z is the image information modulated by image signals. At this time, it is to be understood that the apparatus shown in FIGS. 1 and 2 is changed over so as to act as a laser beam printer so that application of the original illuminating light α is not effected.

Figure 5:
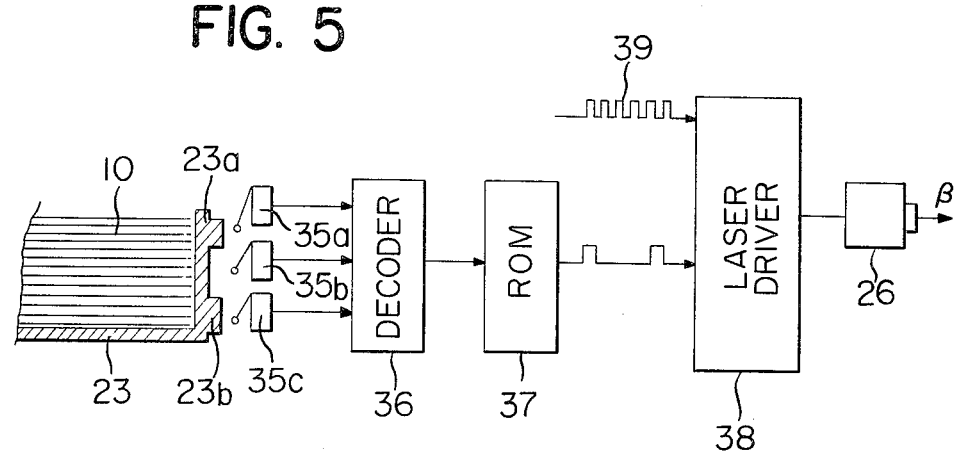
FIG. 5 illustrates a system for controlling the blank exposure of the laser beam in accordance with the size of transfer paper.

Further, where a plurality of sizes of originals or a plurality of types of output paper are used in the apparatus according to these embodiments, the apparatus may preferably be constructed as follows. For example, if, as shown in FIG. 5, provision is made of means for detecting the size of paper set in the apparatus and memory means for prememorizing the non-imaged area of the photosensitive member determined in accordance with the size of paper, it will be possible to effect application of the laser beam by a signal selected from said memory means simply by setting output paper in the apparatus and automatically achieving a blank exposure suited to the size of paper. In FIG. 5, reference numeral 23 designates a paper supply cassette containing output paper 10 therein and formed at the fore end thereof with signal portions such as projected portions 23a and 23b provided in accordance with the size of paper. Designated by 35a, 35b and 35c are microswitches provided to detect the projected portions 23a and 23b. Reference numeral 36 designates a decoder for discriminating the paper size, reference numeral 37 denotes a ROM (read only memory) in which the non-imaged area corresponding to the size of paper is memorized, reference numeral 38 designates a laser driver, reference numeral 39 denotes an image signal, and reference numeral 26 designates a laser oscillator. In the case of a semiconductor laser, the image signal 39 is directly applied to the semiconductor laser to form modulated light.

As described above in detail, if the blank exposure by the laser beam is used, the necessity of providing a complicated illumination device for blank exposure using tiny lamps arranged in accordance with the size of paper and a number of partition plates will be eliminated and further, since the apparatus is of the laser beam scanning and exposure type, even a non-imaged area of any shape can be exposed as desired by application of electrical signal and in addition, it will be possible to sufficiently follow the tendency of the image formation apparatus toward higher speed. The apparatus so far described is merely an illustrative form of the present invention and the present invention is in no way restricted by the original scanning method, the arrangement of the optical system, the image formation process, etc. As described with respect to the above embodiment, it is preferable to use the present invention in an electrophotographic apparatus having both the function of a copying machine and the function of a laser beam printer.

EMBODIMENT 2

This embodiment is an image formation system in an apparatus having both the copier function of optically exposing the surface of a photosensitive member to an original image and the printer function of converting an electrical image signal into light and exposing the surface of the photosensitive member to such light, which system has means for controlling the exposure of the surface of the photosensitive member by the copier and printer functions and means for obtaining the timing for controlling these and wherein the exposure by each function is suitably selected and effected, whereby when a copy having the original image and the image by the electrical signal combined together is to be obtained, copying is effected on one side of copy paper a plurality of times.

Nowadays, multifunction apparatus having both the copier function of producing copies from hard copy originals and the printer function of utilizing the copier function to produce hard copies by other input than hard copies (electricity, magnetism or the like) are going to be put into practical use.

The present invention provides, in such a multifunction apparatus, an apparatus which is provided with a mechanism for permitting copying to be effected on one side of copy paper in a superimposed manner a plurality of times, thereby having very effective functions.

The effective functions will hereinafter be described in detail.

Figure 6A:
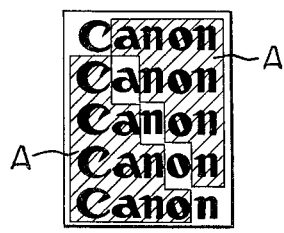
FIGS. 6(A) and (B) show an original and a reproduced image to illustrate a second embodiment of the present invention.
Figure 6B:
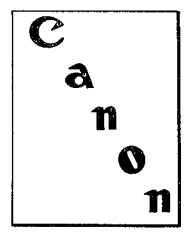

(1) If use is made of the copy mode and the printer mode at one time, elimination of part of a hard copy original image will be possible. For example, if an original as shown in FIG. 6(A) is copied in the copy mode and also a laser beam is applied to the portion A of the drum on which an electrostatic latent image is formed, toner will not adhere to the exposed portion and so, there will be obtained a copy as shown in FIG. 6(B) in which the image of the portion A has been eliminated. If, by utilizing this function, the copying of an original by the copy mode and the elimination by the printer mode are effected at a first time of the plurality of times of one-side copying and the information writing by the printer mode is effected at a second time, then there will be obtained a copy in which part of an existing original has been changed. To achieve such an operation at a single time of copying, there will be required a cumbersome procedure of attaching black paper to that portion of the original which is to be changed. This is because, if a white ground remains in that portion which is to be changed, the drum portion corresponding to such portion will be exposed to light to eliminate the information by the laser.

Likewise, if it is attempted to copy a form in the copy mode and to carry out the procedure of writing data in the printer mode at a single time, there will be required a procedure of attaching black paper to the original because the portion in which information is added by the printer must not be exposed to the light from the original, whereas in a plurality of times of one-side copying, the form may be copied in the copy mode at a first time and data may be written in the printer mode at a second time (alternatively, these procedures may be reversed) and thus, no special procedure will be required in producing copies.

Figure 7:
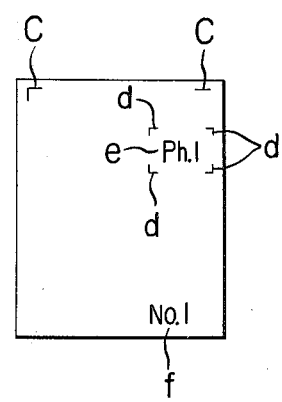
FIG. 7 illustrates an example of the photograph positioning pasteboard applicable to the second embodiment.

(2) When various manuals are to be prepared, it is often desired that photographs which require half tones be copied in the copy mode while characters are edited by a word processor and copied in the printer mode. In this case, in order to bring a photograph to a required portion, it is necessary to place the photograph at a predetermined position on the original carriage and at such time, a photograph positioning pasteboard would be convenient. The pasteboard may be obtained by copying an image laid out by a CRT display in the printer mode, and the contents thereof, as shown in FIG. 7, comprise a reference mark (c) used when the pasteboard is placed on an original, a frame (d) indicating the position at which the photograph is to be placed, photograph number (e), and pasteboard number (f). A photograph is attached to this pasteboard, and at a first time of copying, the photograph is copied in the copy mode and also elimination of the area other than the photograph portion is effected in the printer mode. At a second time of copying, characters are copied in the printer mode, whereby the photograph is analogously copied while the characters are digitally copied, thus providing a hard copy of good image quality. In the copy thus provided, the marks and characters on the pasteboard have been automatically eliminated.

To achieve this at a single time, the pasteboard must be black paper, but black paper makes the marks and characters hard to be recognized and also the positioning thereof on the original carriage is very difficult.

Figure 8A:
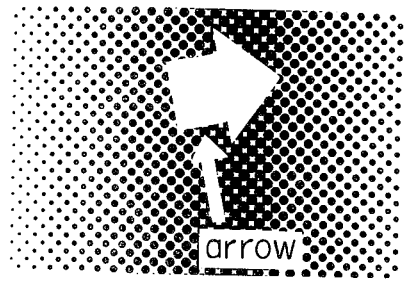
FIGS. 8(A)–(D) illustrate the process in which characters and patterns are inserted into a photographic image.
Figure 8B:
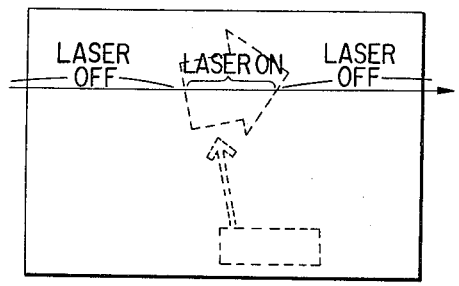
Figure 8C:
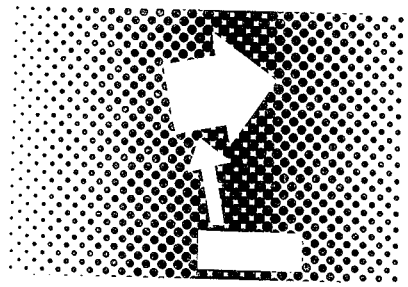
Figure 8D:
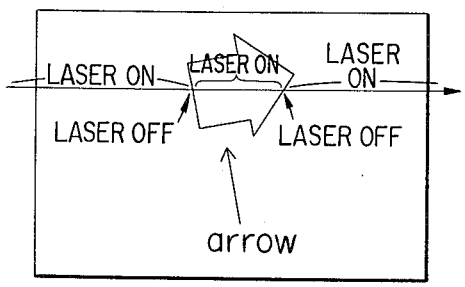

Further, in an apparatus capable of forming images a plurality of times on one-side of a copy, it is also possible to insert characters and patterns into a photographic image. For example, when characters and arrows (the arrow indicating a thing and the arrow indicating the direction of movement of the thing) are to be inserted in a photograph as shown in FIG. 8(A), the photograph is copied in the copy mode and selective elimination of part of the photograph is effected in the printer mode as shown in FIG. 8(B) at a first time, whereby obtaining an image as shown in FIG. 8(C). If, at a second time, an image as shown in FIG. 8(D) is recorded in the printer mode, characters and pattern background can be clearly displayed at any density. While the foregoing description has been made with a photograph as the object to be copied in the copy mode, copying of illustrations, graphs, etc. is also possible.

Figure 9A:
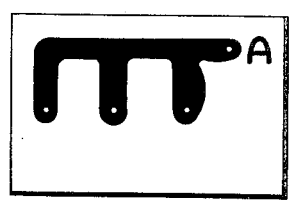
FIGS. 9(A)–(C) illustrate the process in which the patterns of the front and back sides are obtained as a single hard copy.
Figure 9B:
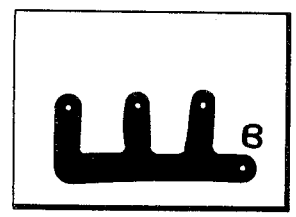
Figure 9C:
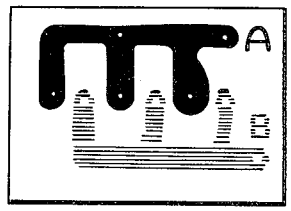

(3) Where it is desired to obtain the patterns of the front and back sides of various printed base plates as a single hard copy, if the pattern of the front side (FIG. 9(A)) is copied in the copy mode at a first time and the pattern of the back side (FIG. 9(B)) is copied in the copy mode at a second time and the laser is turned on and off for every several scans in the printer mode, the pattern of the back side will be constructed by straight lines and therefore, even is such patterns are constructed into a single hard copy, distinction between the patterns of the front and back sides will be possible as shown in FIG. 9(C).

(4) In an apparatus capable of forming images a plurality of times on one-side of a copy, if two or more developing devices containing toners of different colors are provided around the periphery of the drum and control is effected so that one of them comes close to the drum during copying in timed relationship with the conveyance of copy paper, there will be obtained a multicolored hard copy.

(5) In an apparatus capable of forming images a plurality of times on one-side of a copy, even where it is operated only with the copy function, two originals of A4 size may be reduced in scale to ½ and may thus be converted into a single sheet of A4 size.

As has been described above, in a multifunction apparatus having both the copier function and the printer function, very effective functions can be realized by providing a mechanism capable of forming images a plurality of times on one-side of a copy.

Figure 10:
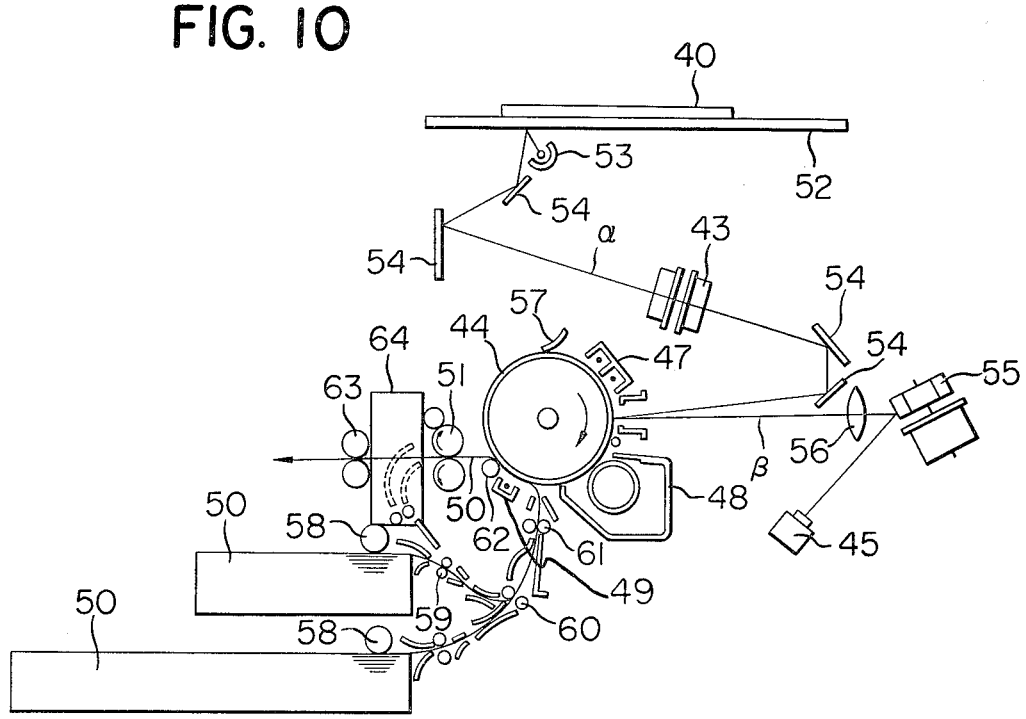
FIG. 10 is a schematic view showing the construction of the second embodiment of the present invention.

FIG. 10 is a front view showing the interior of the image formation apparatus body. An original 40 placed on an original carriage 52 is illuminated by an illumination lamp 53 and the reflected optical image α thereof is projected upon the surface of a drum 44 via a mirror 54 and through a lens 43. On the other hand, a laser device 45 (for example, a semiconductor laser) emits a laser beam β light-modulated in accordance with an electrical signal from outside. The laser beam β is scanned by a light deflector 55 and imaged on the surface of the drum 44 by an image forming lens 56 having f-θ characteristic. The former is the light applying method in the copier function and the latter is the light applying method in the printer function. Around the periphery of the drum 44 rotated in the direction of the arrow, there is disposed a charger 47 for imparting static electricity to the drum, a developing device 48 for visualizing the latent image, an image transfer device 49 for transferring the image visualized by the developing device 48 to copy paper 50, a fixing device 51 for fixing the image transferred to the copy paper 50, and a cleaning device 57 for removing toner adhering to the drum 44 after the image transfer. Sheets of copy paper 50 are piled below the drum 44 and are taken out one by one by a paper feed roller 58 and fed into the apparatus by first conveyor rollers 59. At this time, to prevent oblique movement of copy paper 50, the first conveyor rollers 59 are once stopped so that the copy paper 50 forms a loop. Next, the copy paper passes between second conveyor rollers 60 and is conveyed to timing rollers 61. The timing rollers 61 are once stopped to register the leading end of the copy paper 50 to the toner image on the drum 44, and when timing has been taken therebetween, the timing rollers start to rotate again and feed the copy paper 50 to the drum 44. The copy paper 50 is brought into intimate contact with the surface of the drum 44 and toner image is transferred from the drum to the copy paper by the image transfer device 49. After the image transfer, the copy paper 50 is separated from the surface of the drum 44 by a separating unit 62, and the transferred toner image is fixed by the fixing device 51 so as to provide a permanent image, and then the copy paper is discharged onto a copy tray by paper discharge rollers 63. Designated by 64 is the mechanism capable of causing the apparatus to form images a plurality of times on one-side of a copy according to the present invention. The mechanism 64 is disposed between the fixing device 51 and the paper discharge rollers 63.

Figure 11:
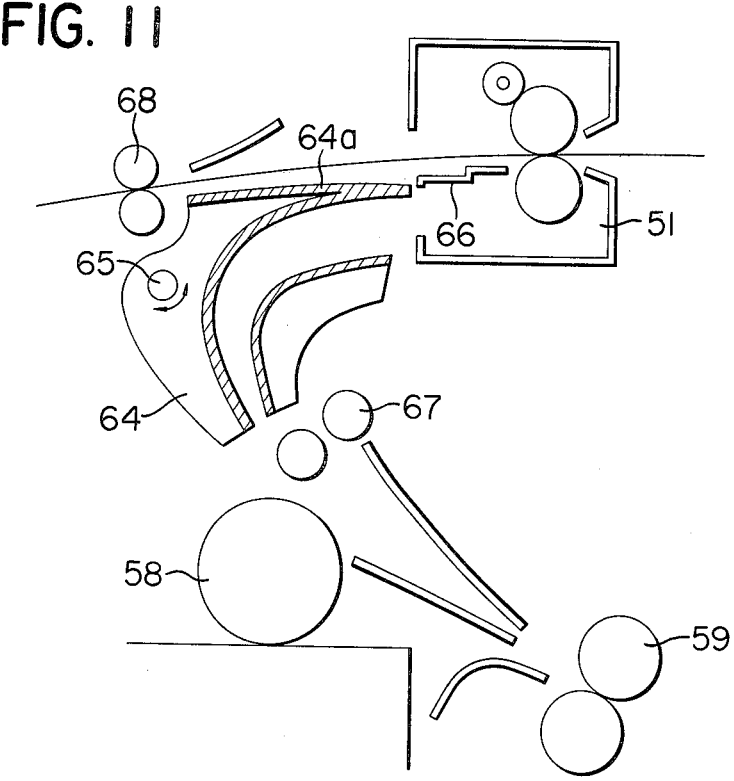
FIGS. 11 and 12 illustrate a mechanism capable of forming a plurality of images on one-side of a copy in the second embodiment.
Figure 12:
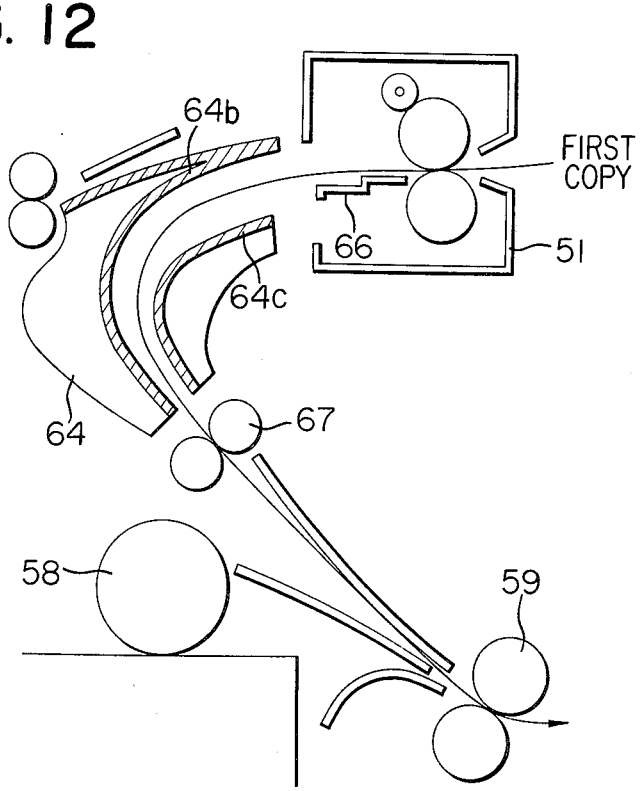
Figure 14C:
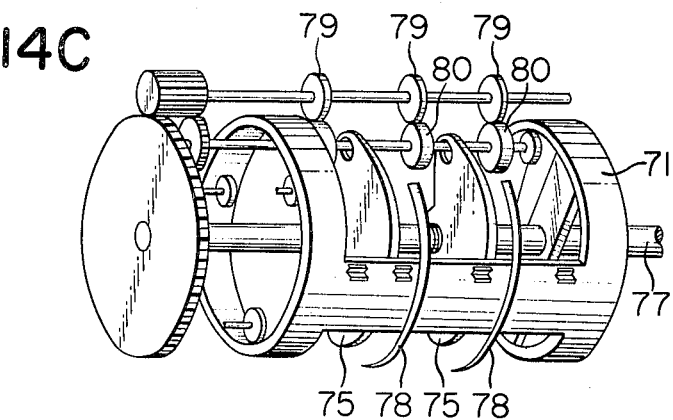
FIG. 14(C) is a perspective view of portions of the FIG. 13 embodiment.

FIGS. 11 and 12 show the details of the neighborhood of the mechanism 64 capable of causing the apparatus to form images a plurality on times of one-side of a copy. The mechanism 64 is rotatable about a support shaft 65 and may assume two different positions, shown in FIGS. 11 and 12, under control of a control circuit. During the ordinary one-side single time copying, as shown in FIG. 11, the guide plate 64a of the mechanism 64 is positioned slightly below the outlet guide plate 66 of the fixing device 51 so as to guide the paper toward the paper discharge rollers 63. However, during one-side plural times copying, until before the last copying, as shown in FIG. 12, the reception port formed by the guide plates 64b and 64c of the mechanism 64 is positioned so as to intercept the paper discharged from the outlet guide plate 66 of the fixing device so that the paper is again fed back to the first conveyor rollers 59 by third conveyor rollers 67 and copying is again effected on the paper. During the last copying, the mechanism is shifted to the position of FIG. 11 and the copy paper 50 is discharged.

Description will now be made of the operation of the present invention based on the above-described construction.

First, an original is placed on the original carriage while output signals of the information to be eliminated from, to be added to or to be changed in part of the original are put into the controller. Subsequently, the operator puts into the control circuit how many times copying is to be effected on one side of a copy paper. As an example, two times of copying will be described. The operator applies the light of the illumination lamp to the original to start copying and on the other hand, while judging the conditions of the copying, he feeds an image signal to the laser device so that a signal representing the desired size or shape, namely, a pattern of information to be eliminated from, to be added to or to be changed in the original, can be projected upon a predetermined location of the original. The laser beam light-modulated in accordance therewith is scanned in a direction perpendicular to the direction of rotation of the drum by the light modulator and thus, the information converted into a light signal, coupled with the rotation of the drum, is formed as a pattern of the desired size or shape at the predetermined location of the original. Accordingly, an electrostatic latent image corresponding to the image of the original is formed on the drum and also an image converted from an electrical signal into a light signal is superimposed thereon. Then, the latent image formed on the drum is visualized by the developing device as in the conventional copying machine. Copy paper fed in timed relationship with the drum is brought into intimate contact with the surface of the drum, whereafter the image on the drum surface is transferred to the copy paper by the image transfer device. The copy paper having the image so transferred thereto is separated from the drum and transported to the fixing device for fixation, and is again transported to the first conveyor rollers by the mechanism capable of causing copying on one-side of a copy a plurality of times. The copy paper, whose oblique movement has been corrected there, is transported to the drum by the timing rollers in timed relationship with the image to be copied next. In a manner similar to the first copying, the copy paper is subjected to image transfer and fixation, and then discharged through the guide plate of the mechanism 64 which has been changed over by the control circuit.

EMBODIMENT 3

Reference is now had to FIGS. 13 and 14(A)-(C) to describe another form of the mechanism capable of causing the apparatus to form images a plurality of times on one-side of a copy.

Sheets of copy paper 50 are taken out one by one by a paper feed roller 58 and fed to first conveyor rollers 59. At this time, to prevent oblique movement of copy paper 50, the first conveyor rollers 59 are once stopped, so that the copy paper 50 forms a loop. Next, the copy paper passes between second conveyor rollers 60 and is fed to timing rollers 61. The timing rollers 61 are once stopped to register the leading end of the copy paper 50 to the toner image on the photosensitive drum 44 and when the timing has been taken, the timing rollers 61 start to rotate again. Designated by 71 is a paper conveyor drum constituting the mechanism capable of a plurality of times of one-side copying. This paper conveyor drum 71 is in contact with the photosensitive drum 44 and is rotated at a velocity equal to that of the drum 44 and has on its periphery a keep pawl 72 for keeping the leading end of the copy paper as shown in FIG. 14(A). The keep pawl 72 is pivotable about the support bar 73 thereof and is subjected to a force directed toward the center of the paper conveyor drum 71, by the action of a torsion spring 74. When the copy paper 50 has come near the paper conveyor drum 71, the keep pawl 72 is spaced apart from the paper conveyor drum 71 by the action of a cam 75 so as to receive the leading end 50a of the copy paper 50, whereafter the keep pawl firmly grasps the copy paper 50 by the action of the cam 75 being released. The copy paper 50 grasped by the keep pawl 72 is brought into intimate contact with the photosensitive drum 44 with the rotation of the paper conveyor drum 71, and toner image is transferred to the copy paper by the image transfer device 49, and then the copy paper 50 is separated from the photosensitive drum 44. As the paper conveyor drum 71 is further rotated, the keep pawl 72 is spaced apart from the paper conveyor drum 71 by the action of the cam 75 (FIGS. 14(B) and (C)), so that the leading end of the copy paper is separated from the paper conveyor drum 71 and then, the copy paper is separated from the paper conveyor drum 71 by a separating pawl 76 which is in contact with the paper conveyor drum 71, and is conveyed to the fixing device 51 to fix the toner on the copy paper, and is finally discharged by paper discharge rollers 73. The cam 75 is supported by the rotary shaft 77 of the paper conveyor drum 71 and is movable only axially thereof and when in its regular position, the cam 75 acts on the keep pawl 72, but when it changes its position by the signal from the control circuit, the cam 75 no longer acts on the keep pawl 72. When the keep pawl 72 is not spaced apart from the paper conveyor drum 71 by movement of the cam 75, the copy paper 50 twines itself round the paper conveyor drum 71 with the aid of guide plate 78 and guide rollers 79 and 80 with the rotation of the paper conveyor drum 71 and is again directed to the photosensitive drum 44.

The operaton of the above-described construction will now be explained with two times of copying on one side being taken as an example.

The operator puts it into the control circuit that two times of copying on one side is to be effected and depresses the start button, whereby the first copying is started. The copying is effected with the light of the illumination lamp being applied to the original on the original carriage while the laser beam modulated in accordance with the signal previously put into the controller is applied from the laser device to the photosensitive drum 44 to form thereon a latent image corresponding to the image (primarily the original image part of which has been eliminated). In time relationship with the formation of the latent image on the photosensitive drum, copy paper 50 passes through the paper feed roller 58, the first and second conveyor rollers and the timing rollers and is grasped by the keep pawl 72 existing on the periphery of the paper conveyor drum 71. With the rotation of the paper conveyor drum 71, the copy paper 50 is brought into intimate contact with the photosensitive drum 44 and the toner image into which the latent image has been visualized by the developing device is transferred to the copy paper by the image transfer device 49, whereafter the copy paper is separated from the photosensitive drum.

During the first copying, the cam 75 is brought out of its regular position by the control circuit so as not to act on the keep pawl 72 and therefore, the copy paper 50 is twined round the paper conveyor drum 71 while being grasped by the keep pawl 72 and the leading end thereof is again directed to the photosensitive drum 44. Simultaneously therewith, the second latent image formation (primarily the writing of the image in the printer function) is being effected on the photosensitive drum 44 and in timed relationshp with the first copy image, the second copy image is transferred. Since the paper conveyor drum 71 is rotated in synchronism with the photosensitive drum 44, image misregistration rarely occurs even if copying is effected a plurality of times. Since the keep pawl 72 becomes spaced apart from the paper conveyor drum 71 by the action of the cam 75, the copy paper separated from the photosensitive drum 44 has the leading end thereof separated from the paper conveyor drum 71 and is completely separated by the separating pawl 76, and is conveyed to the fixing device for fixation of the toner, whereafter it is discharged as a permanent copy image.

The above embodiment has been described with respect to a case where a laser is used as the means for converting electrical signals into light signals, whereas the present invention is not restricted thereto but it is also possible to install a Braun tube in proximity to the drum surface, impart image signals and deflection signals thereto, scan a calescence point on the drum surface and expose the drum surface to a dot pattern.

As described above, the present invention demonstrates a very effective function by providing a mechanism capable of forming an image a plurality on times of one-side of a copy in a printing apparatus having the copier function and the printer function.

EMBODIMENT 4

This embodiment is an image formation system in an apparatus having both the copier function of optically exposing the surface of a photosensitive member to an original image and the printer function of converting an electrical image signal into light and exposing the surface of the photosensitive member to such light. This system has means for controlling the exposure of the surface of the photosensitive member by the copier and printer functions and means for obtaining the timing for controlling these. The exposure by each function is suitably selected and effected, whereby when a copy having the original image and the image by the electrical image signal combined together is to be obtained, light is applied, by the use of the exposure means of the printer function, to an area in which the quantity of light of the exposure by the copy function is insufficient at the boundary between the exposed areas by the two functions, to thereby eliminate the unsatisfactory image at the boundary between the original image and the image by the electrical signal on the combined image and provide a good combined copy.

Figure 15:
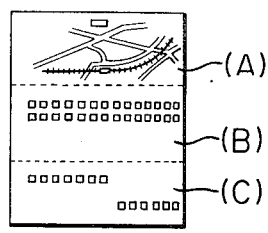
FIG. 15 illustrates an original sample of an image which is an example to be formed in a fourth embodiment of the present invention.

For example, in the case of an original as shown in FIG. 15 which consists of a photograph or a picture (portion A) and writings (portions B and C), when it is desired to obtain a copy in which the portions A and C remain unchanged but the writing in the portion B has been changed, there have heretofore been required cumbersome procedures of cutting out necessary portions from this original and a print of the writing to be changed which has been edited by a word processor and printed out by a printer, joining the cut-out portions together and copying them.

Figure 16:
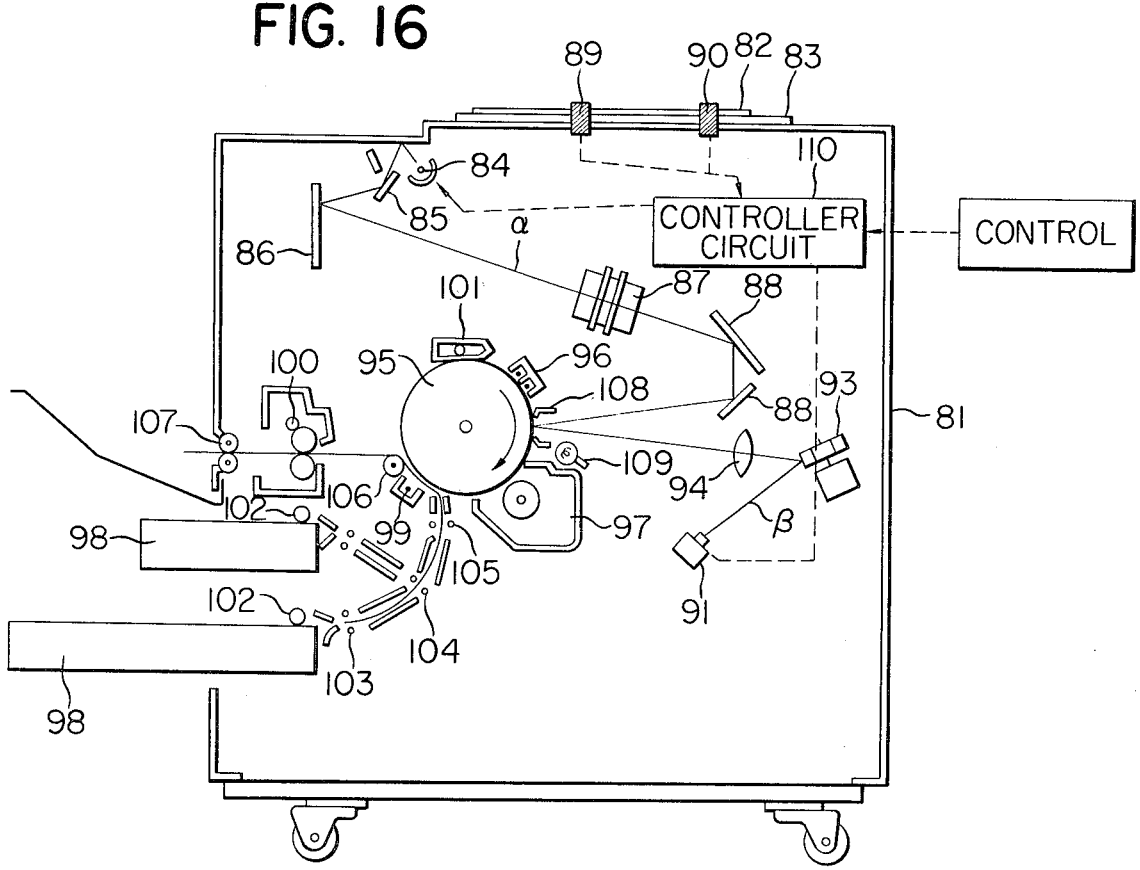
FIG. 16 is a schematic view illustrating the construction of the fourth embodiment of the present invention.

The present embodiment of the present invention will hereinafter be described by reference to FIG. 16. In FIG. 16, reference numeral 81 designates the body of a copying apparatus. An apparatus for copying an original 82 and an apparatus for converting an electrical signal into light and copying an image are incorporated in the body 81. That is, reference numeral 83 designates an original carriage provided in the upper portion of the body 81, reference numeral 84 denotes an illumination lamp for illuminating the original 82 placed on the original carriage 83, reference numerals 85 and 86 designate movable mirrors for scanning the original, reference numeral 87 denote a lens, reference numeral 88 designates a mirror disposed at a predetermined position, and reference numerals 89 and 90 denote levers movable parallel to the original scanning direction (the details of which will be described later). On the other hand, reference numeral 91 designates a laser device which emits a laser beam $\beta$ light-modulated in accordance with electrical signal, reference numeral 93 denotes a light deflector for scanning the laser beam $\beta$, and reference numeral 94 designates an image forming lens having f-$\theta$ characteristic.

Designated by 95 is a photosensitive drum rotatable in the direction of the arrow. Around the periphery of the photosensitive drum 95, there is disposed a charger 96 for imparting static electricity to the drum, a discharger 98 and whole surface exposure lamp 109 for forming an electrostatic latent image, a developing device 97 for visualizing the latent image, and image transfer device 99 for transferring the image visualized by the developing device 97 to copy paper 98, a fixing device 100 for fixing the image transferred to the copy paper 98, and a cleaning device 101 for removing toner adhering to the photosensitive drum 95 after the image transfer.

Sheets of copy paper 98 are piled below the photosensitive drum 95 and may be taken out one by one by a paper feed roller 102 and fed through first conveyor rollers 103, second conveyor rollers 104 and timing rollers 105 into between the photosensitive drum 95 and the image transfer device 99. Designated by 106 is a separating unit for separating from the photosensitive drum 95 the copy paper 98 having the toner image transferred thereto, and denoted by 107 is paper discharge rollers for discharging the copy paper 98 having the toner image fixed thereon. Reference numeral 110 designates the controller circuit of the present invention which controls the illumination lamp 84 and the laser device 91 by position signals entered by the levers 89 and 90.

Description will now be made of means for combining the original image and the electrical signal image in the present embodiment.

Figure 17:
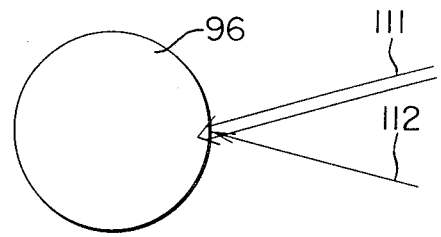
FIG. 17 illustrates the relation between the slit exposure width and the beam exposure in the fourth embodiment.
Figure 18A:
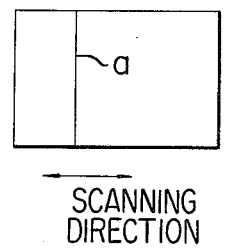
FIGS. 18(A) and (B) are a plan view and a side view, respectively, showing the scanning direction of light on an original.
Figure 18B:
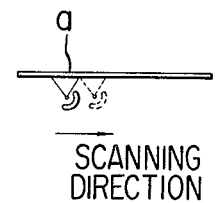
Figure 19A:
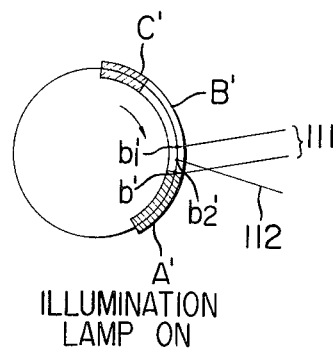
FIGS. 19(A) and (B) and FIGS. 20(A) and (B) illustrate the scanning position relations between the illuminating system and the original during the turn-on and turn-off of the illumination lamp.
Figure 19B:
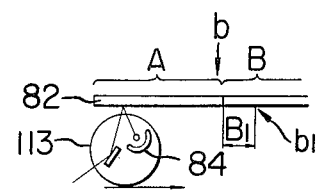

A case where the image of the portion B of the original shown in FIG. 15 is changed will be described as an example. Where the original image and the electrical signal image are to be combined together, it is necessary that the optical image from the original does not arrive at the photosensitive drum when a latent image is formed on the photosensitive drum by a laser beam. The reason is that toner does not adhere to the portion of the photosensitive drum which has been exposed to light and therefore, if the optical image of the original is applied to the photosensitive drum simultaneously with the application of the laser beam, the image by the laser beam will not be represented on the portion of the drum which corresponds to the white ground of the original image. For example, if all the portion B is a white ground, all the image by the laser beam will be erased. Also, during the copier function, the application of the optical image onto the photosensitive drum 95 is effected in the fashion of slit exposure by a light beam 111 having a width of about 10 mm, as shown in FIG. 17. As regards the image of an area (a) on the original shown in FIGS. 18(A) and (B) which has a slight width in the scanning direction, the latent image of the area (a) is little by little formed on the photosensitive drum while the area (a) is being illuminated, and sufficient latent image formation is achieved only when the illumination of the area (a) has been terminated. On the other hand, the exposure by the printer function is effected by a laser beam 112 having a diameter of about 100$\mu$ and an image having a width of 100$\mu$ is obtained in one scan. As regards the positions on the drum surface to which the light beam of the slit exposure and the laser beam are applied, the positions best suited for the latent image formation are chosen by taking into account the angles of incidence of these beams on the photosensitive drum, the position of the discharging wire of the discharging step effected simultaneously with the exposure, the discharging width, etc. Assume that the central position of the slit exposure is coincident with the position to which the laser beam is applied. In FIGS. 19(A) and (B), if the illumination lamp 84 is turned off in the course during which the illumination system 113 is scanning the original 82 in the direction of the arrow and at a point of time whereat the illumination of the boundary b between the portions A and B of the original has been terminated, then the formation of the latent image of the portion A will be completey accomplished. However, the image of the illuminated area at the point of time whereat the illumination lamp has been turned off, namely, the area $B_1$ ($b-b_1$) having the width of slit exposure from the end b of the portion B, is being illuminated and therefore, a latent image, though incomplete, is formed on the area ($b'-b'_1$) of the photosensitive drum which is slit-exposed. The timing of the exposure by the laser beam at this time is very important: if modulating light corresponding to electrical signal is applied to copy as soon as the illumination lamp is turned off, the image of the portion $B_1$ of the original will thinly remain in the portion of the photosensitive drum ranging from the portion b' to the portion $b'_2$ which corresponds to the position to which the laser beam has been applied, and the electrical signal image affected by the original image will be copied on the portion ranging from the portion $b'_2$ to the portion $b'_1$, thus providing an unsatisfactory copy. Therefore, if the laser is continually turned on from the time when the portion b' of the photosensitive drum has come to the position to which the laser beam is applied until the portion $b'_1$ has passed such position and thereafter, the laser beam is light-modulated in accordance with the electrical signal, then the image of the portion $B_1$ could be completely eliminated. A copy in which the electrical signal images subsequent to $b_1$ have been faithfully copied may then be obtained.

Figure 20A:
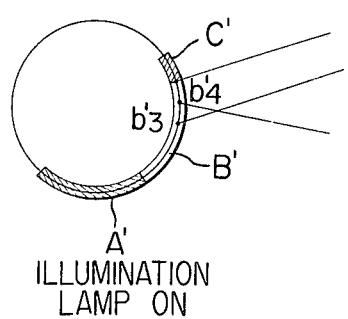
Figure 20B:
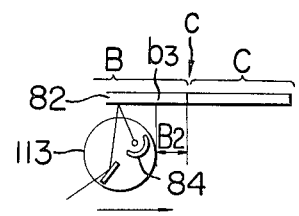

Next, in FIGS. 20(A) and (B), if the illumination lamp is turned on in the course during which the illumination system 113 is scanning the original 82 in the direction of the arrow and at a point of time whereat the illumination of the boundary c between the portions B and C of the original should be started, formation of the latent image of the portion C will be completely accomplished. However, the image of the illuminated area at the point of time whereat the illumination lamp has been turned on, namely, the area $B_2$ ($b_3-c$) ranging back from the end c of the portion C and having the width of slit exposure, is being illuminated and therefore, at this time, a latent image, though incomplete, is formed on the area ($b'_3-c'$) of the photosensitive drum which is slit-exposed. The timing of the exposure by the laser beam at this time is very important: if modulating light corresponding to the electrical signal is cut to copy as soon as the illumination lamp is turned on, an electrical signal image affected by the original image will be copied on the portion of the photosensitive drum ranging from a portion $b'_3$ to a portion $b'_4$ which corresponds to the position to which the laser beam is applied, and the image of the portion $B_2$ of the original will thinly remain on the portion of the drum ranging from the portion $b'_4$ to the portion C', thus providing an unsatisfactory copy. Therefore, if modulating light corresponding to electrical signal is applied until the portion $b'_3$ of the photosensitive drum comes to the position to which the laser beam is applied and thereafter, the laser is continually turned on until the portion c' comes to said position and the laser is turned off when the portion c' has come to said position, then the electrical signal image could be faithfully copied and there may be obtained a copy in which the image of the portion $B_2$ has been completely eliminated.

Figure 21:
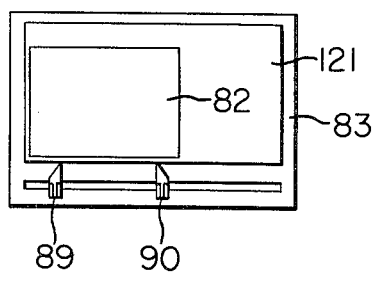
FIG. 21 is a plan view showing the relationship between the original carriage and the timing lever.
Figure 22:
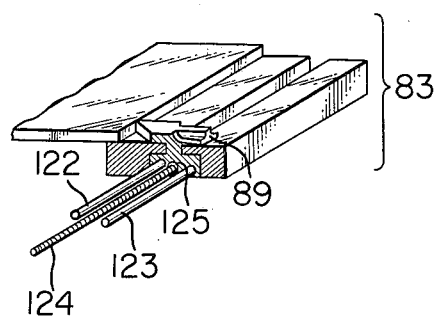
FIG. 22 is a partly broken away perspective view showing the supporting mechanism for the timing lever.

Description will now be made of means for obtaining the timing for starting and stopping the application of the original image to the photosensitive drum in the apparatus of the present invention. As shown in FIG. 21, the original carriage 83 comprises a transparent portion 121 for supporting an original 82 thereon, and timing levers 89 and 90 movable along the forward end thereof. In FIG. 22, the timing levers 89 and 90 are supported by guide bars 122 and 123 fixed to the original carriage 83 and are movable parallel to the scanning direction of the original 82. A rod 124 extending parallel to the guide bars 122 and 123 and having magnetic pulse signals recorded therein at an equal pitch and a magnetic head 125 to which the rod 124 is fitted and for reading the signals are fixed to the original carriage 83 and the timing levers 89, 90, respectively. By moving the timing levers 89 and 90, the pulse signals recorded in the magnetic rod 124 may be read by the magnetic head 125 and the positions of the timing levers 89 and 90 may be known from the pulse count number. Accordingly, if the operator brings the timing levers 89 and 90 to predetermined positions as soon as he places the original 82 on the original carriage 83, such position information will be put into the control circuit 110 and the aforementioned timing will be obtained.

Next, the operation of the present invention based on the above-described construction will be described by taking as an example a case where the image of the portion B of the original shown in FIG. 15 is changed. First, the operator enters into the controller the output signal of an image which is to be copied on the portion B of the original. Then, the operator places the original 82 on the original carriage 83, registers the index marks of the timing levers 89 and 90 to the front end b and rear end c of the portion B, and depresses the start button. The scanning of the original 82 is started and the exposure by the copier function is effected until the position b' on the photosensitive drum 95 upon which the optical image of the portion b is to be projected comes to the laser scanning position. When the portion b' has come to the laser scanning position, continuous oscillation of the laser beam $\beta$ from the laser device 91 is started by the control circuit 110 into which the position of the portion b has been entered by the timing lever 89. Further, when the photosensitive drum 95 has rotated a distance corresponding to one half of the slit exposure width and the portion $b'_2$ has come to the laser scanning position, the illumination lamp 84 is turned off and by this time, the latent image of the portion A of the original has been completely formed. Further, when the portion $b'_1$ of the photosensitive drum 95 has come to the laser scanning position, the laser beam $\beta$ shifts from the continuous oscillation of the oscillation modulated in accordance with image signal, and the image entered in advance into the controller is recorded on the portion B' of the photosensitive drum 95 which corresponds to the portion B of the original.

Figure 23:
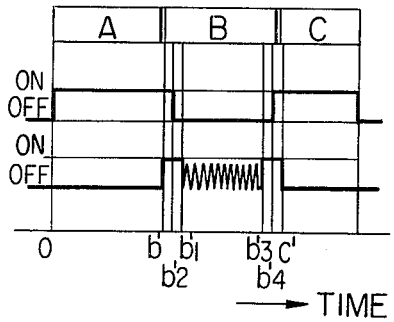
FIG. 23 is a timing chart.

When the portion $b'_3$ has come to the laser scanning position by the control circuit 110 into which the position of the portion c has been entered by the timing lever 90, the laser beam $\beta$ shifts to continuous oscillation and further, when the portion $b'_4$ has come to the laser scanning position, the illumination lamp 84 is turned on and starts to illuminate the image of the portion c. Further, when the portion c' has come to the laser scanning position, the laser terminates its oscillation. Thereafter only the exposure by the copier function is effected and the latent image of the portion c is completely formed. In this manner, a latent image in which the images of the portions A and C of the original and the electrical signal image to be changed to the portion B have been combined is formed on the photosensitive drum 95. The above-described exposure control timing is shown in FIG. 23. The latent image on the photosensitive drum 95 is visualized by the developing device 97 as in the conventional copying machine. On the other hand, sheets of copy paper 98 are fed one by one by the paper feed roller 102 in timed relationship with the photosensitive drum 95, and oblique movement of the fed copy paper is corrected by the first conveyor rollers 103, whereafter the copy paper passes between the second conveyor rollers 104 and is timed by the timing rollers 105 so that the leading end of the copy paper 98 is registered to the toner image on the photosensitive drum 95, and then is transported to the photosensitive drum 95. The copy paper is brought into intimate contact with the surface of the photosensitive drum, from which the toner image is transferred to the copy paper by the image transfer device 99. Thereafter the copy paper is separated from the photosensitive drum 95 by the separating unit 106 and transported to the fixing device 100 for fixation of the toner image, and then the copy paper is discharged as a hard copy of combined image by the paper discharge rollers 107.

Figure 24A:
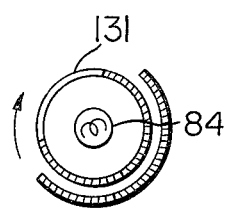
FIGS. 24(A) and (B) are cross-sectional views showing a construction provided with a cylindrical slit rotatable about the illumination lamp.

FIGS. 24(A) and (B) show a modification of the device for switching on and off the application of the original image onto the photosensitive drum.

Figure 24B:
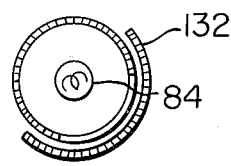

FIGS. 24(A) and (B) show a modification in which a cylindrical slit 131 rotatable about the illumination lamp 84 is provided. When the original is illuminated, the slit 131 is brought to the position of FIG. 24(A), and when the original is not illuminated, the slit 131 is rotated as shown in FIG. 24(B). Designated by 132 is a light-intercepting member for preventing the light from leaking to the outside when the slit 131 is in the position of FIG. 24(B).

Figure 25:
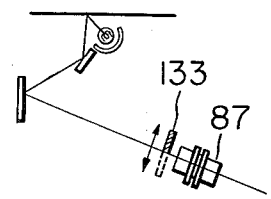
FIG. 25 illustrates an example in which a slit is provided before a lens at a point whereat the width of the optical image becomes smallest.

FIG. 25 shows an embodiment in which a slit 133 is provided before a lens 87 at a point whereat the width of the optical image becomes smallest in the path until the optical image of the original reaches the photosensitive drum 95. By by opening and closing this slit, the application of the optical image onto the photosensitive drum 95 is switched on and off.

Figure 26:
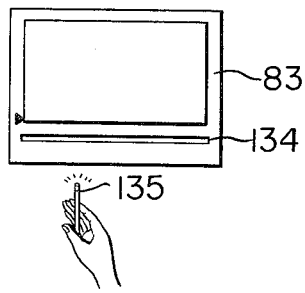
FIGS. 26-28 illustrate further examples of the means for obtaining the timing for switching on and off the exposure of the photosensitive drum.
Figure 27:
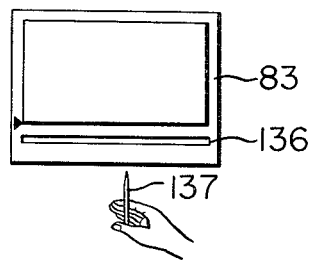
Figure 28:
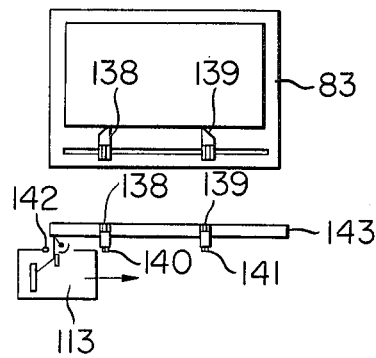

FIGS. 26–28 show further embodiments for obtaining the timing for switching on and off the exposure of the photosensitive drum 95.

In the embodiment of FIG. 26, a light-receiving element array 134 is provided on the original carriage 83 and a light-emitting member 135 is used to apply light at the position for taking the timing, and the signal thereof is applied to the control circuit.

In the embodiment of FIG. 27, a pressure sensing element array 136 is provided on the original carriage 83 and a pressing member 137 is used to press at the position for taking the timing, and the signal thereof is applied to the control circuit.

In the embodiment of FIG. 28, movable members 138 and 139 similar to the aforementioned timing levers are provided on the original carriage 83, and magnets 140, 141 and reed switch 142 are mounted on the movable members and the original illuminating system 113, respectively. The exposure ON-OFF means is operated by the switching action occurring when the illuminating system 113 has arrived at the position designated by the movable members 138 and 139. In this case, it is impossible to know in advance the ON-OFF timing of the exposure and therefore, the switching action must of course be applied to the operation which is first to take place.

The above embodiments have been described with respect to a case where, as regards the relation between the position of slit exposure of the original image and the laser beam application position, the central position of slit exposure is coincident with the laser beam aplication position, whereas the present invention is not restricted thereto. It is a matter of course that the ON-OFF timing of the exposure by the copier function and the printer function is determined by these positional relations.

Further, the embodiments have been described as the fixed original type apparatus, whereas the present invention is also applicable to the movable original type apparatus.

Also, an optical system comprising a plurality of mirrors and lenses has been described as being used as the means for applying the optical image of the original to the photosensitive drum, whereas it is also possible to use a cellfock lens array and this is more convenient because, in this case, the slit exposure width is several millimeters and the recording range of electrical signal image is wider.

Figure 29:
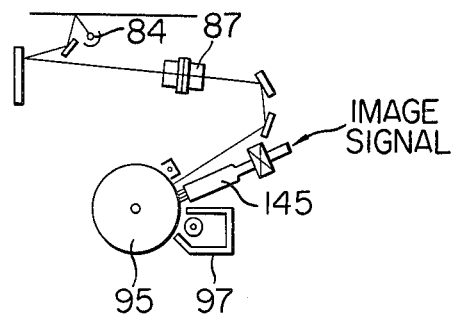
FIG. 29 illustrates a modification of the fourth embodiment.

The embodiments of the present invention have been described with respect to a case where a laser is used as the means for converting electrical signals into light signals, whereas the present invention is not restricted thereto but, as shown in FIG. 29, a Braun tube 145 may be installed in proximity to the surface of the photosensitive drum, and image signal and deflection signal may be imparted thereto to scan a calescence point on the drum surface and expose the drum surface to a dot pattern.

Figure 30:
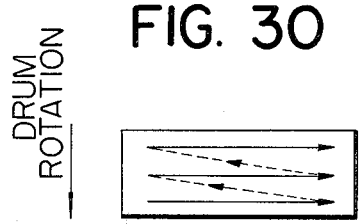
FIGS. 30 and 31 illustrate the relations between the direction of rotation of the drum and the scanning line.
Figure 31:
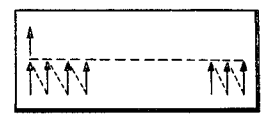
Figure 32:
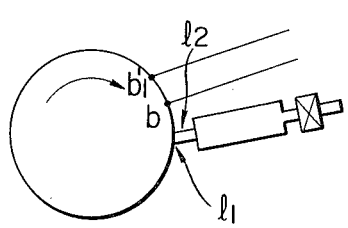
FIG. 32 illustrates the relation between the slit exposure area and the Braun tube exposure area in the scanning mode of FIG. 30 or 31.

This case is similar to the above-described embodiments in that, as shown in FIG. 30, the photosensitive drum surface is scanned by one line each in a direction perpendicular to the direction of rotation of the drum. Unlike this, in a system as shown in FIG. 31 wherein the photosensitive drum surface is scanned over a certain width in a direction parallel to the direction of rotation of the drum and the scanning progresses in a direction perpendicular to the direction of rotation of the drum, the image in the area on the photosensitive drum in which unsatisfactory electrostatic latent image has been formed may be eliminated in a manner described hereinafter. That is, if the slit exposure area and the Braun tube exposure area are in the positional relation as shown in FIG. 32, the Braun tube may always be caused to be luminous from a point of time whereat the portion b' corresponding to the end of the unnecessary portion B of the original 82 has come to the lower end $l_1$ of the luminous portion of the Braun tube till a point of time whereat the portion $b'_1$ spaced apart from the portion b' by an amount corresponding to the slit exposure width has come to the upper end $l_2$ of the luminous portion of the Braun tube. Generally, at what timing from the OFF time of the slit exposure the normal turn-on of the Braun tube should be started and at what timing the Braun tube should be shifted from the normal turn-on to the turn-on corresponding to the electrical signal can be known in advance from the set positions of the slit exposure and Braun tube exposure and so, the timings may be set with some allowance.

Shifting from the portion B to the portion C of the original 82 can be executed in a similar way of conception.

As described above, the present invention can effectively provide a copying apparatus having the copier function and the printer function and which is provided with means for controlling the exposure of the photosensitive drum and means for obtaining the control timing and wherein these are suitably controlled to thereby enable a hard copy in which original image and electrical signal image have been combined to be obtained easily.

EMBODIMENT 5

This embodiment is an improved construction for a safety countermeasure which can be incorporated in the apparatus of the above-described embodiments.

More particularly, this embodiment relates to an information recording apparatus provided with a safety device required when recording by the use of a high energy beam, and is particularly intended to eliminate, in an information recording apparatus comprising a combination of a copying apparatus having an original carriage and a laser beam printer, the danger of the operator being harmed by a laser beam having passed through the original carriage.

Recently, laser beam printers in which the laser recording technique has been applied to the electrophotographic technique heretofore developed primarily with copying machines have been put into practical use as the output apparatus of computers or the like. Now that lasers or apparatus having lasers incorporated therein have become commercially available, importance is attached to the safety countermeasure of these apparatus as the responsibility of enterprises.

In fact, in the United States, RCHSA (Radiation Control for Health and Safety Act of 1968) has already put in force and in Canada, REDRA (Radiation Emitting Devices Regulation Act) has been carried into effect, and in these countries, these safety standards rigidly oblige manufacturers to take safety countermeasures for their products using lasers.

The aforementioned RCHSA (U.S.) is concerned in even the interior structure of apparatus in respect of the safety thereof, and demands that safety be secured not only during normal operation of the apparatus but also in the event of failure or unexpected accident which would result from erroneous manufacture.

In view of such demand of the age, the safety countermeasure is more and more necessary when it is taken into consideration that since the electrophotographic copying machine and the laser beam printer differ only in the method of exposing the photosensitive member to an image and can basically use the identical image formation process, it is relatively readily possible to construct an information recording apparatus having the two functions integrated.

Where the recording apparatus as described above is constructed, attention must be paid to the fact that all of the copying apparatus now commercially available use an original carriage comprising a transmitting glass and an openable original keep member to achieve the original copying function and thus, the operator can easily have access to the optical path of the original exposure portion through the transmitting glass by opening the original keep member.

Where the optical path of the original exposure portion and the optical path of the laser exposure portion can be spatially communicated with each other, it cannot be denied that the following danger would be involved. That is, when the apparatus is being used as a laser beam printer, if the operator opens the original keep member, there would be a danger that part of the laser beam is applied to the operator through the original carriage glass by being reflected by a mirror or other interior member in an unexpected situation during the use of the apparatus, even if there is no problem in the design or manufacture of the machine.

The present embodiment has been made in view of the foregoing point and intends to eliminate the danger of the operator being inadvertently harmed by a high energy beam such as a laser beam. An embodiment of the information recording apparatus provided with a safety device will hereinafter be described in detail with reference to the drawings.

Figure 33:
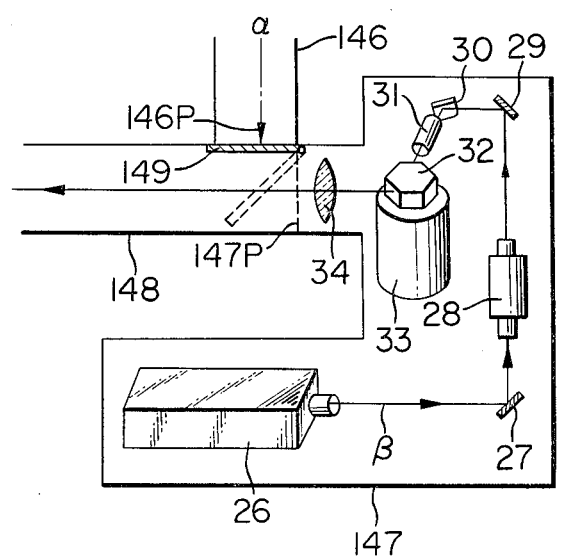
FIG. 33 schematically illustrates the construction of the essential portions of a fifth embodiment of the present invention.

FIG. 33 shows an example in which, in addition to the various elements shown in FIG. 1, there is provided a light-intercepting box 146 for hermetically sealing the original exposure portion, a light-intercepting box 147 for hermetically sealing the laser exposure portion, and a light-intercepting box 148 for hermetically sealing the optical path to direct the lights emitted from said two exposure portions to the photosensitive drum.

The light-intercepting boxes 146 and 147 are communicated with the light-intercepting box 148 leading to the photosensitive drum, through the only openings 146P and 147P thereof, respectively. However, the light-intercepting box 146 of the original exposure portion can be opened outwardly of the apparatus through the original carriage glass, but when the apparatus is normally operated as a copying machine, the light-intercepting box 146 is hermetically sealed by the original keep member.

A mirror 149 is pivotally supported and assumes a position indicated by broken line in FIG. 33 when the original exposure portion is operated, and assumes a position indicated by solid line in FIG. 33 when the laser exposure portion is operated.

Figure 34:
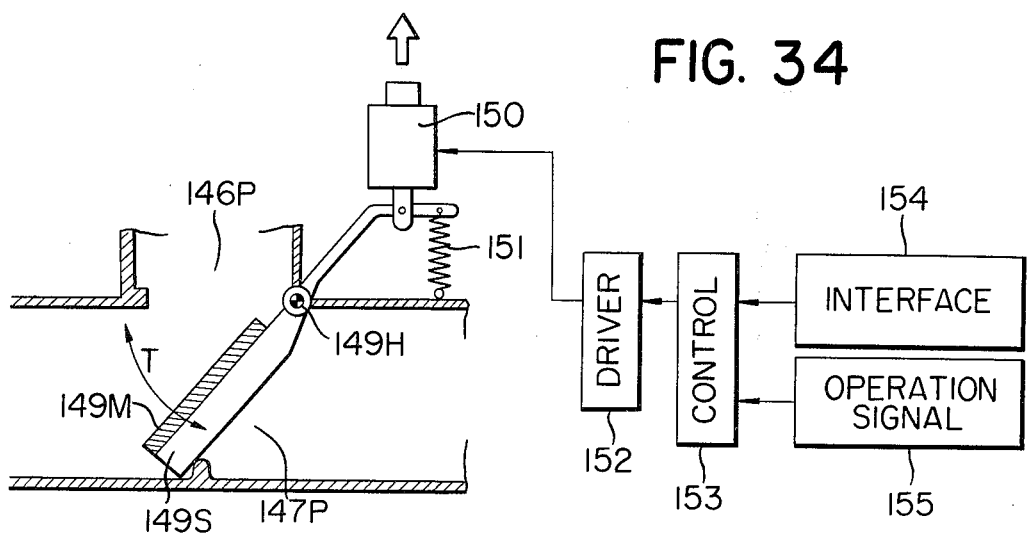
FIG. 34 is an illustration of a mirror pivoting mechanism thereof.

More particularly, the mirror 149, as shown on an enlarged scale in FIG. 34, comprises a mirror portion 149M provided on a member 149S supported by a pivot shaft 149H for pivotal movement in the direction of arrow T, and is normally held at the position shown in FIG. 33 by the action of a tension coil spring 151 to close the opening 146P and thereby hermetically seal the light-intercepting box 146. A plunger 150 is connected to the member 149S, as shown in FIG. 34, and when this plunger is electrically energized, the mirror 149 is moved to its position of FIG. 34 to close the opening 147P and thereby hermetically seal the light-intercepting box 147. In FIG. 34, reference numeral 152 designates a plunger driver, and reference numeral 153 denotes the selective control circuit of the copying machine and the laser beam printer. The control circuit 153 is designed so as to be selectible by an extraneous signal through an interface 154 or even by an operating panel 155.

When the present apparatus of the above-described construction is used as a copying machine, the mirror 149 acts as a mirror for directing the light beam α emitted from the original exposure portion to the photosensitive drum and also acts as a sealing member for sealing the laser exposure portion. If the laser exposure portion is sealed as described above, there is no possibility of imparting a danger to the operator even if the laser beam β is emitted due to a trouble or other cause during the use of the apparatus as a copying machine.

When this apparatus is used as a laser beam printer, the mirror 149 opens the opening 147P to enable the laser beam to be applied to the photosensitive drum while, at the same time, the mirror 149 acts as a sealing member for sealing the light-intercepting box 146 of the original exposure portion.

Figure 35:
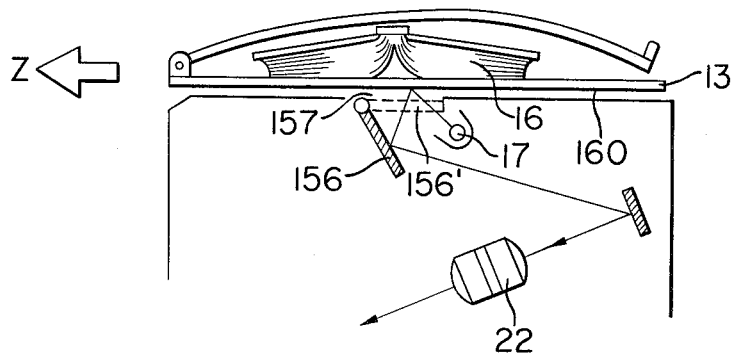
FIG. 35 illustrates a modification of the embodiment shown in FIG. 33.

FIG. 35 shows a modified form of the original exposure portion. This apparatus uses the movable original carriage type copying portion, and the original carriage 13 supporting an original 16 thereon is movable in the direction of arrow Z to scan the surface of the original. If so constructed, as compared with the case of FIG. 33, the opening area of the original exposure portion light-intercepting box 146 to the original carriage can be considerably reduced to thereby permit, for example, the mirror 156 to be used as an opening-closing member. That is, when this apparatus is used as a laser beam printer, the mirror 156 is pivoted to the position 156' by the use of the opening-closing means as shown in FIG. 34 to close the opening 157, thereby achieving the purpose of the invention, namely, the purpose of preventing the harm imparted by unexpected emission of the laser beam. Of course, in this case, the opening-closing member for closing the opening 157 may be provided separately from the mirror 156.

As a modification, it is possible to provide, in the optical path of the original exposure portion, a filter member for attenuating only the light corresponding to the wavelength of the laser beam.

Figure 36:
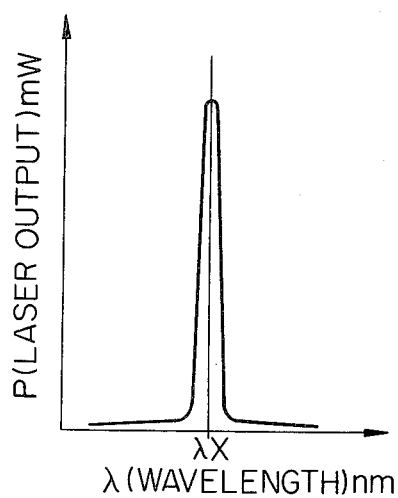
FIG. 36 illustrates the frequency characteristic of the laser beam.
Figure 37:
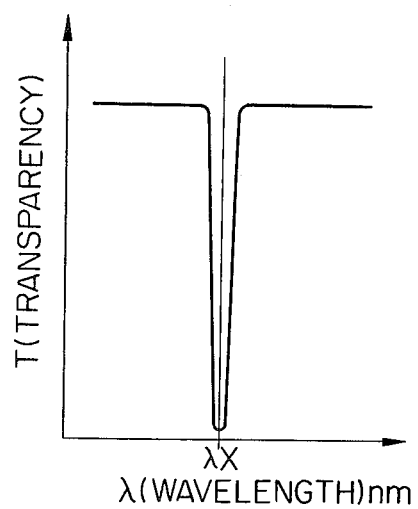
FIG. 37 illustrates the frequency characteristic of the filter.

The laser beam used has a spectrum characteristic as shown in FIG. 36, for example. Accordingly, a filter 160 having a characteristic as shown in FIG. 37 may be used so as to coat that surface of the original carriage which is opposite the original supporting surface (see FIG. 35).

Alternatively, such filter coating may be provided at any location in the optical path of the original exposure portion.

What I claim is:

1. An apparatus for recording on a recording medium with a beam carrying information, said apparatus comprising:
   an original table having a transparent plate providing a surface on which an original may be placed;
   means defining a first optical path extending between said original table and the recording medium;
   means for producing a high energy beam carrying information;
   means defining a second optical path extending between said beam producing means and the recording medium; and
   means, provided across said first optical path, for blocking the high energy beam produced by said producing means from being projected to said original table.

2. An information recording apparatus according to claim 1, wherein said high energy beam is a laser beam.

3. An apparatus according to claim 2, wherein said blocking means block beams having a wavelength corresponding to said laser beam.

4. An apparatus according to claim 1, wherein said blocking means is operable to block and unblock said first optical path.

5. An apparatus according to claim 4, wherein said blocking means includes an optical element which constitutes a part of the first optical path.

* * * * *